United States Patent

Swindt

[11] 4,181,693
[45] Jan. 1, 1980

[54] COOLING TOWER FILL ASSEMBLY

[75] Inventor: Joseph K. Swindt, Santa Rosa, Calif.

[73] Assignee: Ecodyne Corporation, Lincolnshire, Ill.

[21] Appl. No.: 23,108

[22] Filed: Mar. 23, 1979

[51] Int. Cl.² ............................................... B01F 3/04
[52] U.S. Cl. ..................................... 261/111; 248/72; 248/228; 261/DIG. 11
[58] Field of Search ................................ 261/110–112, 261/DIG. 11, DIG. 41; 52/483, 484, 699, 712, 714; 248/72, 214, 216.1, 221.1, 228, 317; 159/4 B

[56] References Cited

U.S. PATENT DOCUMENTS

| | | | |
|---|---|---|---|
| 2,369,264 | 2/1945 | Ten Brink et al. | 261/DIG. 11 |
| 2,747,659 | 5/1956 | Delruelle | 159/4 B |
| 2,780,447 | 2/1957 | Kalthoff, Jr. | 261/111 |
| 3,333,835 | 8/1967 | De Flon | 261/111 |
| 3,389,895 | 6/1968 | De Flon | 261/111 |
| 3,468,521 | 9/1969 | Furlong et al. | 261/111 |
| 3,643,931 | 2/1972 | Henning et al. | 261/111 |
| 3,749,381 | 7/1973 | Furlong et al. | 261/111 |
| 3,799,516 | 3/1974 | Furlong et al. | 261/111 |
| 3,879,502 | 4/1975 | Furlong et al. | 261/111 |
| 4,115,484 | 9/1978 | Saxton | 261/111 |

Primary Examiner—Richard L. Chiesa
Attorney, Agent, or Firm—Joel E. Siegel; Charles M. Kaplan

[57] ABSTRACT

Cooling tower splash fill batts are supported by grids made from vertical and horizontal wire strands. The grids are suspended from fill hanger beams that are adjustably connected to beams in the cooling tower subject to deflection or bowing. Splash deck members are also supported by the fill hanger beams.

10 Claims, 5 Drawing Figures

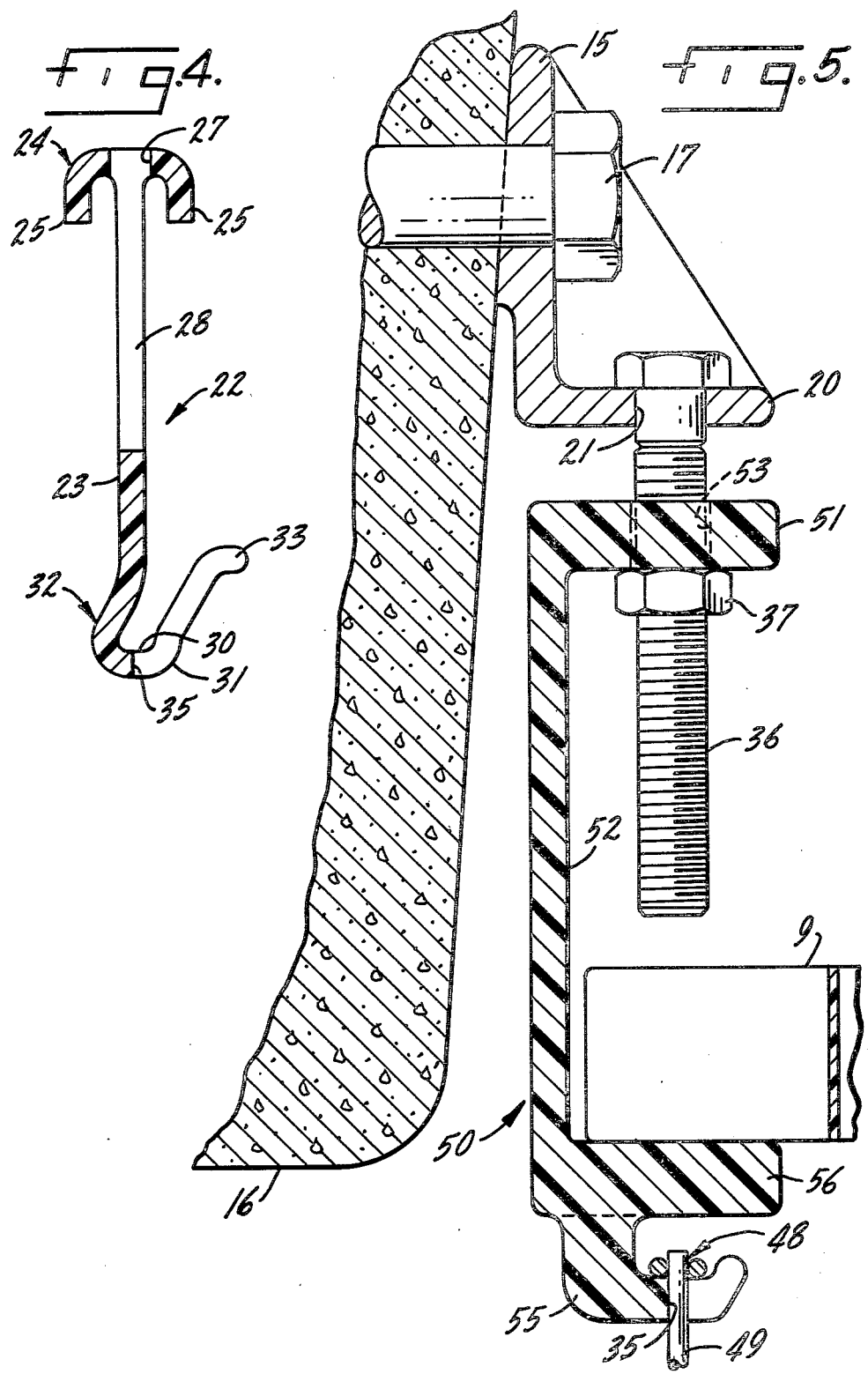

COOLING TOWER FILL ASSEMBLY

BACKGROUND OF THE INVENTION

This invention relates to the splash fill of mechanical or natural draft liquid cooling towers of the crossflow and counterflow types, and more particularly to improvements in the way such fill is supported in concrete cooling towers in a lattice of interconnected wire strands.

In water cooling towers the splash fill is usually supported by suspended rectangular wire grids. Modern splash fill is made from a multitude of corrosion and fungus resistant elongated plastic batts that must be supported parallel with each other in a horizontal position. To accomplish this, the rectangular wire grids that support the fill must be hung straight and flat within the tower and must also be aligned with each other. Modern concrete towers employ long span pre-stressed structural beams, and such beams usually have a variable curvature with respect to the horizon. The variable curvature of such beams makes it difficult to properly hang splash fill supporting grids in the concrete towers.

SUMMARY OF THE INVENTION

Accordingly, it is an object of this invention to provide improved support for the splash fill in liquid cooling towers.

Another object is to provide a splash fill assembly for concrete cooling towers that is sufficiently adjustable to compensate for variable camber or vertical bowing of the concrete beams from which it is suspended.

Another object is to minimize the distance between the splash fill and the hot water basin of a cooling tower.

Another object is to provide structural overload protection for cooling towers with splash fill that may become covered with ice during sub-freezing weather.

Another object is to provide continuous support for wire grids that hold splash fill in a cooling tower.

Another object is to support splash decks immediately above cooling tower fill batts.

Another object is to provide a rugged, relatively low cost, easily erected cooling tower fill assembly that can be adjusted to compensate for settling or shifting of the structure and which does not possess defects found in similar prior art cooling towers.

Other objects and advantages of this invention will be apparent from the specification and claims, and the scope of the invention will be set forth in the claims.

DESCRIPTION OF THE DRAWING

FIG. 4 is an enlarged cross sectional view of the fill hanger support beam of the embodiment of FIGS. 1-3.

FIG. 5 is a cross sectional, partially broken-away schematic representation of another embodiment of this invention.

DESCRIPTION OF PREFERRED EMBODIMENTS

Figure 1:
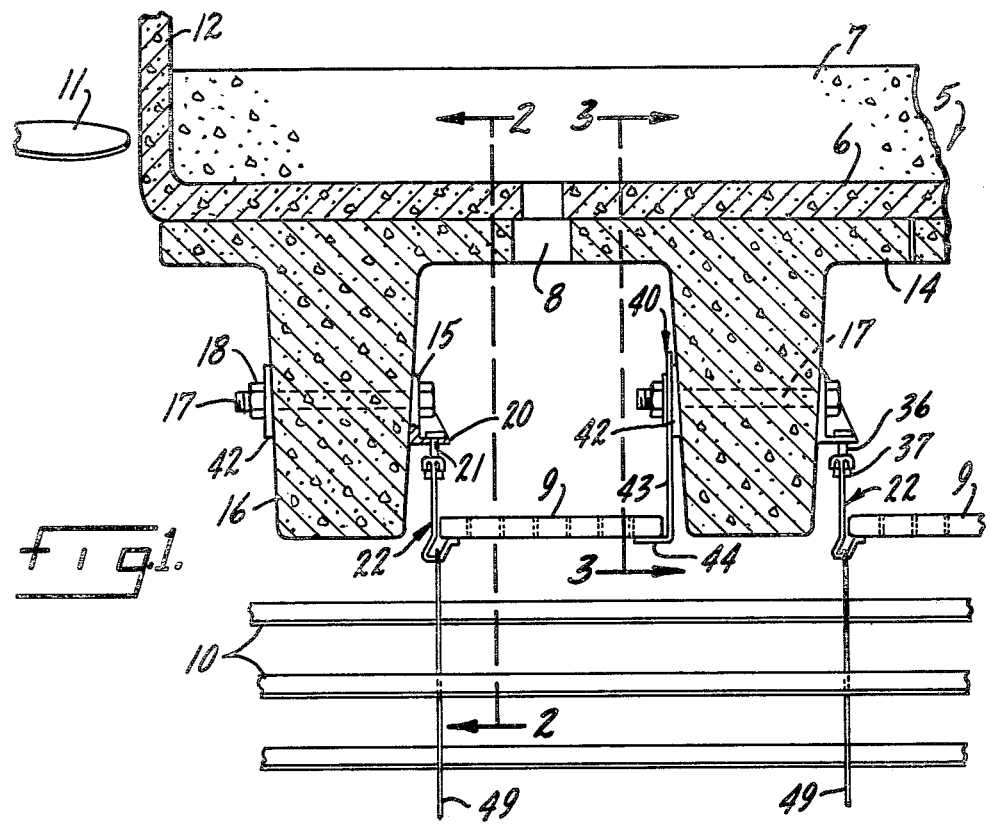
FIG. 1 is a cross sectional, partially broken-away, schematic representation of a cooling tower in accord with this invention.

The drawing shows a portion of the upper end of a conventional cross flow mechanical draft concrete cooling tower 5 in which hot water that is being cooled is pumped into an upper concrete hot water distribution basin 6 surrounded by a retaining wall 7. The water flows downwardly from basin 6 through water distribution holes or nozzles 8. The water flows over through the conventional grid-like splash deck members 9 and elongated splash fill batts 10 held in a support assembly in accord with this invention. Air is drawn through the splash fill and falling water by a rotatable fan 11 in a stack 12. The cooled water is pumped from a collection basin (not shown) below the fill in conventional manner.

Hot water basin 6 is supported by a plurality of generally parallel, horizontally extending, prestressed concrete structural T-beams 14. A plurality of brackets 15 are fastened at spaced intervals to one side of the stems 16 of beams 14 by bolts 17 that pass through horizontal holes in stems 16 and are threaded into nuts 18. A tab 20 projects horizontally from each bracket 15 and there is a vertical hole 21 through each tab.

Figure 2:
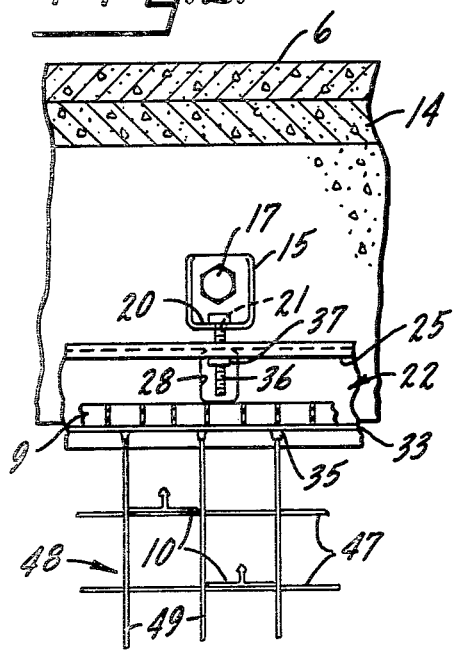
FIG. 2 is a cross sectional view taken along the line 2—2 in FIG. 1.
Figure 3:
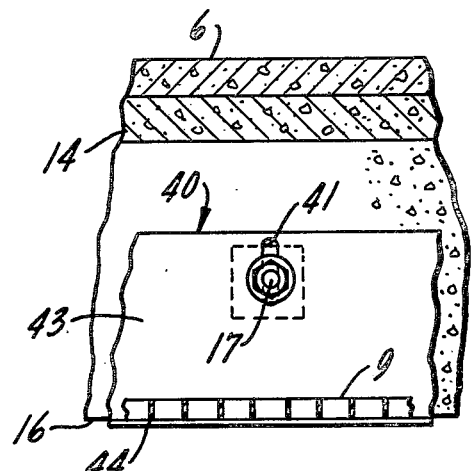
FIG. 3 is a cross sectional view taken along the line 3—3 in FIG. 1.

Unitary, elongated, extruded plastic fill hanger support beams 22 extend generally parallel to beams 14 beneath brackets 15. A vertical web portion 23 extends the length of each beam 22 and a flange 24 extends along the upper end of web portion 23. In the embodiment of FIGS. 1-4, flange 24 is defined by a pair of arms 25 which project downwardly from opposite sides of the upper end of web portion 23. Holes 27 pass through flange 24 and merge into slots 28 in web portion 23. The spacing between each hole 27 and its aligned slot 28 corresponds to the spacing between the holes 21 in adjacent tabs 20. A generally horizontal ledge 30 extends along the lower end of web portion 23, and in the FIG. 1-4 embodiment such a ledge is defined by the bight 31 of the hooked lower end 32 of each beam 22. Hooked end 32 projects upwardly from one side of web 23 and terminates in a generally horizontal edge extention 33. Generally equally spaced vertical slits 35 pass through extension 33 and ledge 30. Edge extension 33 defines a generally horizontal shelf located vertically between flange 24 and ledge 30.

A threaded break bolt 36 passes through the hole 21 in each tab 20 and extends through a hole 27 in flange 24 into the mating slot 28. The head of bolt 36 rests on tab 20 and a nut 37 threaded on the lower end of the bolt bears against and supports the under side of flange 24. The vertical position of beam 22 can be varied by threading nuts 37 up or down bolts 36, thus providing vertically adjustable means connecting the flange 24 of beam 22 to structural beam 14.

Splash deck support beams 40 are attached to structural beams 14 on the side opposite to beams 22. Bolts 17 pass through vertically elongated slots 41 in the upper portion of beams 40 and beveled washers 42 may be employed to position the web 43 of each beam 40 essentially vertically. A shelf 44 extends generally horizontally along the lower end of each beam 40. The fill hanger support beam 22 and the splash deck support beam 40 on the facing sides of adjacent beams 14 are aligned so that their respective shelves 33 and 44 define a pair of splash deck support shelves occupying the same generally horizontal plane. Elongated slots 41 permit vertical adjustment of the position of shelves 44.

A splash deck member 9 is supported on each pair of aligned shelves 33 and 44 beneath the line of liquid distribution openings 8 in basin 6 between adjacent beams 14.

Splash fill batts 10 are supported on the generally horizontal and parallel wire strands 47 of fill hanger grids 48. Strands 47 are welded to generally vertical and parallel wire strands 49 so as to form a lattice of square holes. The uppermost horizontal strand 47 of each grid 48 may be enlarged or may comprise several wires and is supported by the ledge 30 of each beam 22 with the upper ends of the vertical strands 49 passing through slits 35. The holes in adjacent grids 48 are generally aligned beneath splash deck members 9 so that batts 10 can be slid horizontally into place through such aligned holes.

The embodiment of FIG. 5 is identical in structure and operation of the FIG. 1-4 embodiment except for the shape of fill hanger support beam 50, so the same reference numbers have been used for corresponding components. Each beam 50 is a unitary, elongated plastic extrusion having a support flange 51 projecting perpendicularly from the upper end of one side of its vertical web portion 52. Holes 53 through flange 51 receive break bolts 36 and nuts 37 bear against and support the underside of flange 51. A ledge 55 projects generally horizontally from the lower end of web portion 52 for supporting fill hanger grid 49, and vertical slits 35 receive strands 49. A shelf or projection 56 extends perpendicularly from web 52 between flange 51 and shelf 55 for supporting splash deck member 9.

It has thus been shown that by the practice of this invention the splash fill batts 10 of a concrete cooling tower can be properly supported directly from concrete structural beams 14. Vertical adjustment of the nuts 37 on selected bolts 36 permits aligning of corresponding holes on adjacent fill supporting wire grids 48 even though beams 14 may sag or bow upwardly, and even though the cooling tower may settle or shift. The distance between splash fill batts 10 and hot water basin 6 is minimized because splash deck members 9 are supported directly beneath holes 8, thus lowering the cost of constructing and operating the cooling tower. Bolts 36 have a predetermined strength that ensures that they will break or fracture at loads below a maximum safe load for T-beams 14; this prevents ice that may form on fill batts 10 during freezing weather from overloading the cooling tower support structure.

While the present invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A unitary, elongated, extruded plastic beam for supporting fill hanger grids in a liquid cooling tower, comprising: a vertical web portion extending the length of said beam, a support flange projecting perpendicularly from the upper end of one side of said web portion, there being holes through said flange for receiving means for supporting said beam, a fill hanger grid supporting ledge projecting generally horizontally from the lower end of said side of said web portion, and a perpendicular splash deck supporting projection extending from said web portion between said flange and said web.

2. A unitary, elongated, extruded plastic beam for supporting fill hanger grids in a liquid cooling tower, comprising: a vertical web portion extending the length of said beam, a pair of arms projecting downwardly from opposite sides of the upper end of said web portion so as to define a support flange for said beam, there being holes through said flange and aligned slots in said web portion for receiving means for supporting said beam, a hooked lower end projecting upwardly from one side of said web, the bight of said hook defining a fill hanger grid supporting ledge, there being a plurality of generally equally spaced vertical slits through said ledge for receiving vertical strands of a fill hanger grid, and a generally horizontal extension at the terminal edge of said hook defining a shelf for supporting a splash deck of said cooling tower.

3. In a cooling tower in which air flows through splash fill in the tower in cooling relationship with a liquid falling through said fill, an improved splash fill assembly comprising:
   (a) a plurality of generally parallel horizontally extending structural beams supporting a hot water basin at the upper end of said tower, liquid distribution openings passing through said basin between adjacent structural beams;
   (b) a plurality of brackets fastened to each structural beam at spaced intervals along one side thereof;
   (c) an elongated fill hanger support beam extending generally parallel to each structural beam beneath the brackets on such structural beam; a flange extending along the upper end of said fill hanger support beam, a generally horizontal ledge extending along the lower end of said fill hanger support beam, there being a plurality of equally-spaced vertical slits in said ledge, and a generally horizontal shelf on said fill hanger support beam between said flange and said ledge;
   (d) vertically adjustable means connecting the flange on each fill hanger support beam to the brackets on its associated structural beam;
   (e) a splash deck support beam attached to the opposite side of said structural beams, a generally horizontal shelf extending along the lower end of said splash deck support beam;
   (f) the fill hanger support beam and the splash deck support beam on the facing sides of adjacent structural beams being aligned so that their respective shelves define a pair of splash deck support shelves occupying the same generally horizontal plane, a splash deck member supported on each pair of aligned shelves beneath said liquid distribution openings;
   (g) a fill hanger grid supported at its upper end by the ledge of each fill hanger support beam, each grid comprising generally horizontal and vertical strands connected so as to define a lattice of holes, said vertical strands passing through said slits, and the holes on adjacent grids being generally aligned beneath said splash deck members; and
   (h) a plurality of generally horizontal splash fill members extending through said aligned holes in said grids and being supported on said generally horizontal strands.

4. The invention defined in claim 1, wherein each fill hanger support beam has a generally vertical web portion with a pair of arms projecting downwardly from opposite sides of the upper end thereof defining said flange, and a hooked lower end projects upwardly from the side of said web facing toward its paired splash deck support beam, the bight of said hook defining said ledge, and a generally horizontal extension at the terminal edge of said hook defining the shelf of said fill hanger support beam.

5. The invention defined in claim 1, where each fill hanger beam has a generally vertical web portion with said flange at its upper end projecting horizontally from the side of said web facing toward its paired splash deck support beam, said ledge projects from the lower end of said side of said web, and said shelf is defined by a horizontal projection extending from said web between said flange and said ledge.

6. The invention defined in claim 1, wherein said vertically adjustable connecting means comprises break bolts of predetermined strength that ensures fracture thereof at loads below a maximum safe load for said structural beams.

7. The invention defined in claim 1, wherein said fill hanger support beam has a plurality of holes through its flange, and a bolt passes through a hole in each bracket and one of said holes in said flange and a vertically adjustable nut is threaded onto said bolt and supports the underside of said flange.

8. In a concrete cooling tower in which air flows through splash fill in the tower in cooling relationship with a liquid falling through said fill, an improved splash fill assembly comprising:
   (a) a plurality of generally parallel horizontally extending concrete structural beams supporting a concrete hot water basin at the upper end of said tower, liquid distribution openings passing through said basin between adjacent structural beams;
   (b) a plurality of brackets fastened to each structural beam at spaced intervals along one side thereof, a tab projecting horizontally from each bracket and having a hole therethrough;
   (c) a unitary elongated fill hanger support beam extending generally parallel to each structural beam beneath the brackets on such structural beam, a vertical web portion extending the length of said beam, a flange extending along the upper end of said web portion, a generally horizontal ledge extending along the lower end of said web portion, there being holes through said flange and a plurality of equally-spaced vertical slits in said ledge, and a generally horizontal shelf on said fill hanger beam between said flange and said ledge;
   (d) each of said holes in said flange being aligned with the hole through one of said tabs, a bolt passing through said aligned holes and a nut in the associated slot in said web being threaded onto said bolt so as to connect said fill hanger support beam to said structural beam in a vertically adjustable manner;
   (e) a splash deck support beam attached to the opposite side of said structural beams, a generally horizontal shelf extending along the lower end of said splash deck support beam;
   (f) the fill hanger support beam and the splash deck support beam on the facing sides of adjacent structural beams being aligned so that their respective shelves define a pair of splash deck support shelves occupying the same generally horizontal plane, a splash deck member supported on each pair of aligned shelves beneath said liquid distribution openings;
   (g) a fill hanger grid supported at its upper end by the ledge of each fill hanger support beam, each grid comprising generally horizontal and vertical strands connected so as to define a lattice of holes, said vertical strands passing through said slits, and the holes on adjacent grids being generally aligned beneath said splash deck members; and
   (h) a plurality of generally horizontal splash fill members extending through said aligned holes in said grids and being supported on said generally horizontal strands.

9. The invention defined in claim 8, wherein said fill hanger beam comprises a pair of arms projecting downwardly from opposite sides of the upper end of said web portion for defining said flange, and a hooked lower end projects upwardly from the side of said web facing toward its paired splash deck support beam, the bight of said hook defining said ledge, and a generally horizontal extension at the terminal edge of said hook defining the shelf of said fill hanger support beam.

10. The invention defined in claim 8, wherein said fill hanger support beam comprises said flange projecting generally perpendicularly from the upper end of said web portion on the side facing toward its paired splash deck support beam, said ledge projecting from the lower end of said side of said web, and said shelf being defined by a horizontal projection extending from said web between said flange and said web.

* * * * *